(12) United States Patent
Sweeney

(10) Patent No.: US 6,530,170 B1
(45) Date of Patent: Mar. 11, 2003

(54) SECURE FISHING POLE AND REEL LOCKING ASSEMBLY

(76) Inventor: James D. Sweeney, 7027 Sheffield Dr., Lakeland, FL (US) 33810

( * ) Notice: Subject to any disclaimer, the term of this patent is extended or adjusted under 35 U.S.C. 154(b) by 0 days.

(21) Appl. No.: 09/982,715

(22) Filed: Oct. 19, 2001

(51) Int. Cl.⁷ .............................................. A01K 97/10
(52) U.S. Cl. ..................................... 43/21.2; 211/70.8
(58) Field of Search ........................ 43/21.2; 211/70.8, 211/70.7, 4; 248/551, 552, 538, 513, 514

(56) References Cited

U.S. PATENT DOCUMENTS

| | | | | |
|---|---|---|---|---|
| 3,958,694 A | * | 5/1976 | Pritz ............................ | 211/4 |
| 4,027,798 A | * | 6/1977 | Swaim ........................ | 211/70.8 |
| 4,871,099 A | * | 10/1989 | Bogar, Jr. ..................... | 43/21.2 |
| 5,435,473 A | * | 7/1995 | Larkum ....................... | 211/70.8 |
| 5,571,227 A | * | 11/1996 | Pisarek ........................ | 43/21.2 |
| 5,632,427 A | * | 5/1997 | Gattuso et al. ............... | 43/21.2 |
| 6,360,902 B1 | * | 3/2002 | Searles ........................ | 211/70.8 |

* cited by examiner

Primary Examiner—Peter M. Poon
Assistant Examiner—Joan M. Olszewski
(74) Attorney, Agent, or Firm—George A. Bode; Lisa D. Velez; Bode & Associates

(57) ABSTRACT

A secure fishing pole and reel locking assembly comprising a pole holder rack and a reel cover which is adapted to be mounted to a wall and locked. When the reel cover is locked, the reel cover locks the fishing poles in the pole holder rack and covers the reels. The reel cover is adapted to be locked via a pad lock or other locking mechanism.

13 Claims, 3 Drawing Sheets

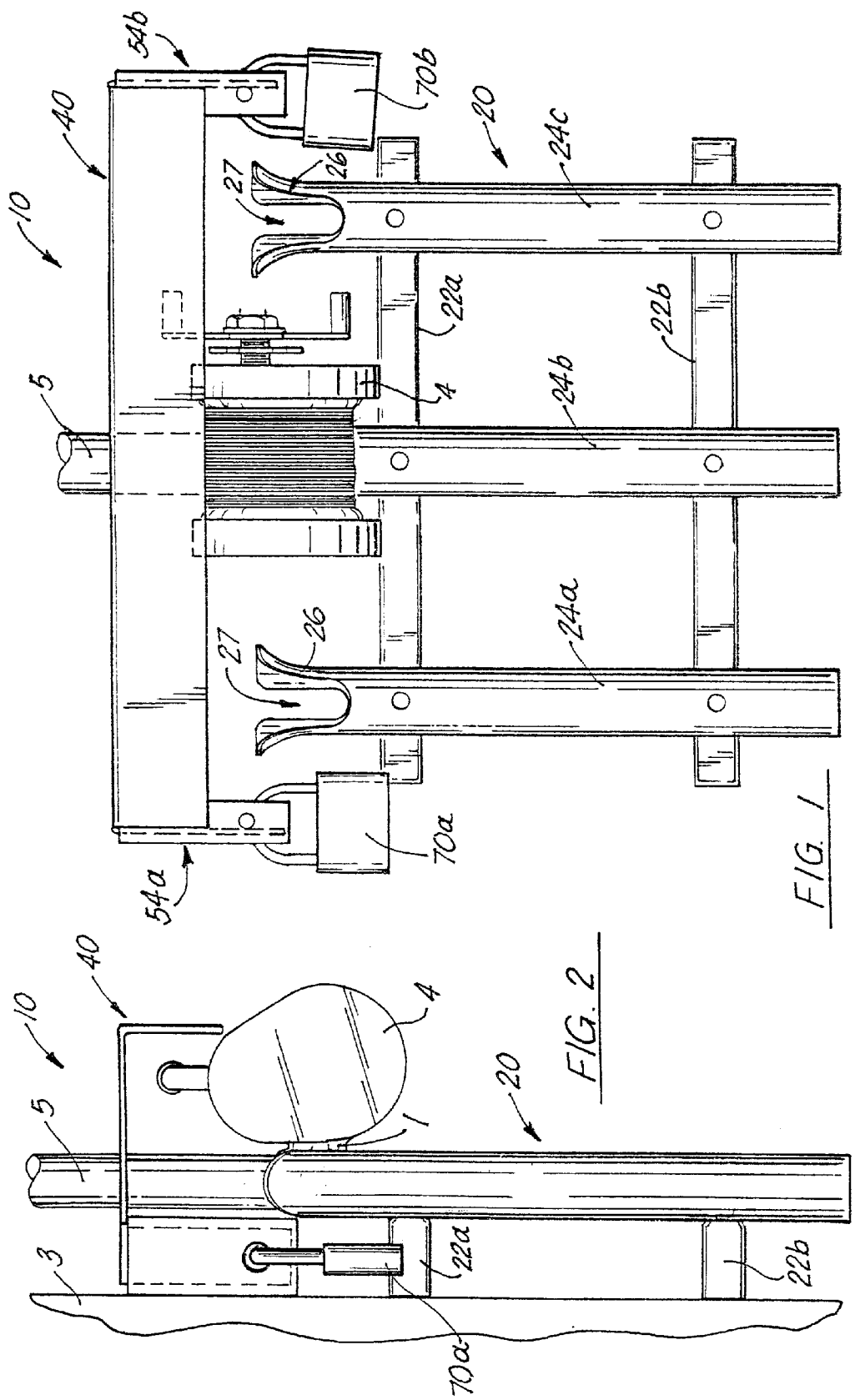

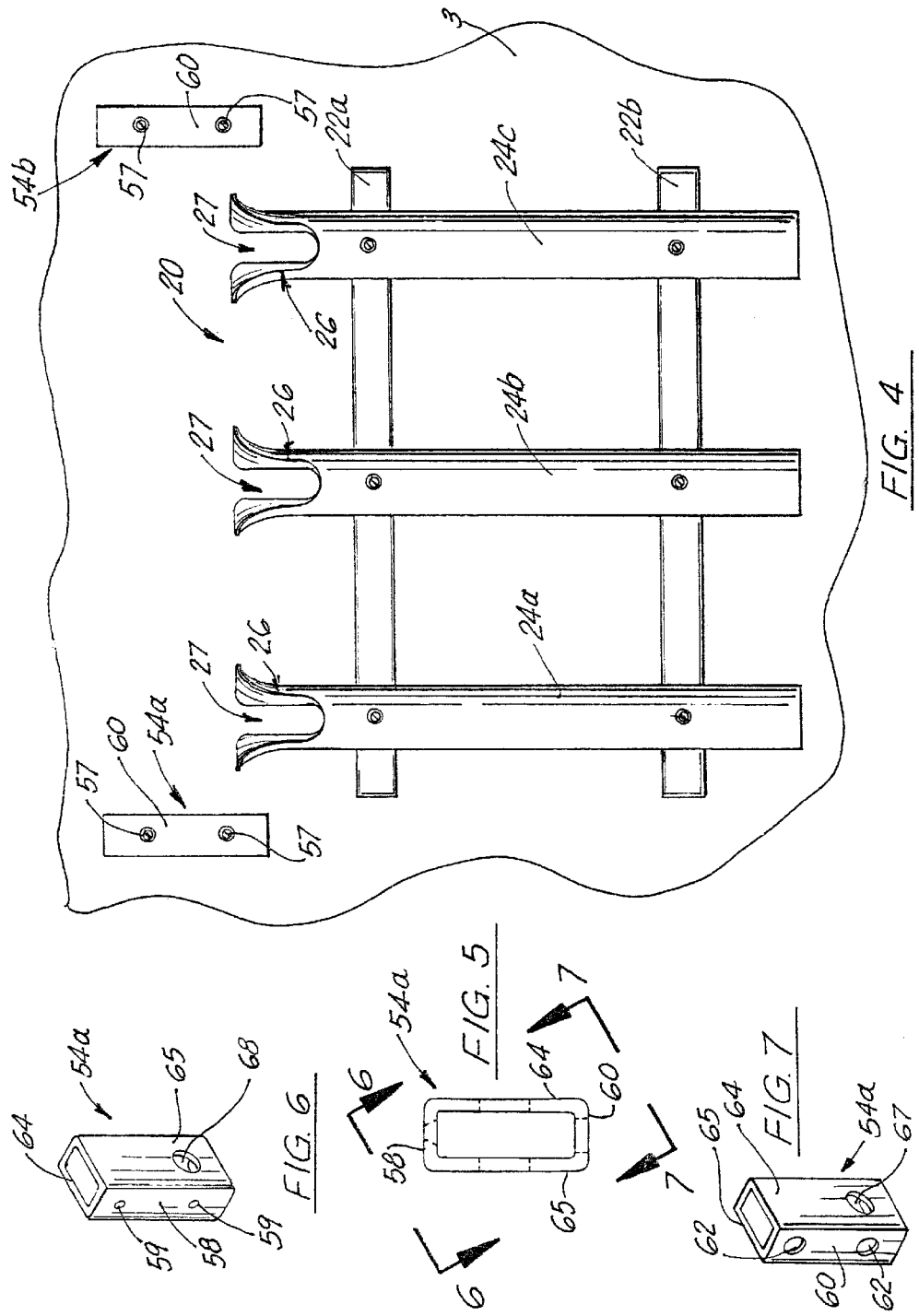

SECURE FISHING POLE AND REEL LOCKING ASSEMBLY

BACKGROUND OF THE INVENTION

1. Field of the Invention

The present invention relates to lockable fishing pole holders and, more particularly, to a secure fishing pole and reel locking assembly to secure and lock both the pole and reel.

2. General Background

Fishing pole holders which prevent the theft of a fishing pole are well known. However, such known lockable fishing pole holders are primarily focused on securing the fishing pole and are not necessarily designed to protect the reel from being detached and stolen from the fishing pole.

Several holders which are aimed at securing or locking fishing poles have been patented.

For example, U.S. Pat. No. 5,435,473, issued to J. A. Larkum, entitled "LOCKABLE FISHING ROD HOLDER," discloses a lockable fishing rod holder mountable to a vehicle comprising: vertical tubular rod holders into which handles of fishing rods are inserted. Each tube has a slot extending a short distance from its top downward to receive the post of a fishing reel. A horizontal restraining bar passes through aligned, opposing holes provided in each tube above the reel post to prevent removal of any rods. A pad lock passing through a hole provided in one end of the restraining bar and a bend in the other end of the restraining bar to prevent removal of the restraining bar.

U.S. Pat. No. 5,588,542, issued to L. J. Winkler, Jr., et al., entitled "FISHING ROD RACK," discloses a fishing rod rack which supports a plurality of fishing rods relative to a support surface. The rack comprises lower and upper engaging assemblies. The lower assembly is mounted to a vertical wall surface for receiving the lower end of fishing rods in lower receiving apertures. The upper assembly is mounted to the same vertical wall surface and spaced from the lower assembly for receiving the upper ends of the fishing rods so as to support the fishing rods in cooperation with the lower assembly. The upper assembly includes fixed and pivoting upper support plates which can be opened by an end latch to facilitate positioning the upper end of fishing rods into the upper receiving apertures directed through the closed support plates.

U.S. Pat. No. 5,560,138, issued to Dentsbier, entitled "FISHING ROD HOLDER," discloses a holder which is designed to retain in a preselected position one or more slender, elongated, rod-shaped objects such as a fishing rod.

U.S. Pat. No. 4,871,099, issued to Bogar Jr. entitled "FISHING ROD HOLDER," discloses a plurality of vertically extending tubular rod holders connected to horizontally spaced supports in which the top of each rod holder includes first downwardly and inwardly tapered slot and a second downwardly extending slot diametrically opposed to the first slot for receiving and holding a fishing reel.

U.S. Pat. No. 4,063,646 issued to National Manufacturing Company, of Chatham, N.J., on the application of O. Stahl, Jr., entitled "LATCHED ROD RACK," discloses a latchable holder for fishing rods which includes a rod receiving member and an opposed latching member swingably secured thereto. Spaced-apart, hook-shaped extensions or hooks on the rod receiving member are included to underlie the rods while spaced-apart pins carried by the latching member overlie the rods. The resilient block members are carried between the hooks and the pins to grasp and cushion rods within the rack when closed. A locking means secures the rods in place within the holder.

Other patents related to lockable racks include U.S. Pat. No. 5,287,972, issued to Saathoff, entitled "GUN RACK"; U.S. Pat. No. 5,520,291, issued to Graham, entitled "PARTITIONED LOCKING RACK"; and, U.S. Pat. No. 1,342,517, issued to Tyson, entitled "BILLIARD CUE LOCK" which relate to various designs of gun racks and billiard cue racks.

As will be seen more fully below, the present invention is substantially different in structure, methodology and approach from that of prior fishing rod racks.

SUMMARY OF THE PRESENT INVENTION

The preferred embodiment of secure fishing pole and reel locking assembly of the present invention solves the aforementioned problems in a straight forward and simple manner.

Broadly, the present invention contemplates a secure fishing pole and reel locking assembly comprising a pole holder rack mountable to a wall and which is adapted to store and support at least one fishing pole wherein the at least one fishing pole includes at least one reel. The assembly further includes a lockable reel cover mountable to the wall and which, when locked, locks the at least one fishing pole in the pole holder rack and covers the at least one reel.

In view of the above, an object of the present invention is to provide a secure fishing pole and reel locking assembly which prevents the theft or tampering of the reel while also securing the fishing pole.

In view of the above, a feature of the present invention is to provide a secure fishing pole and reel locking assembly which is simple to install.

Another feature of the present invention is to provide a secure fishing pole and reel locking assembly which is relatively simple structurally and thus simple to manufacture.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 1 illustrates a front perspective view of the secure fishing pole and reel locking assembly of the present invention;

FIG. 2 illustrates a side perspective view of the secure fishing pole and reel locking assembly of the present invention;

FIG. 4 illustrates a front view of the pole holder rack of the present invention;

FIG. 5 illustrates a male bracket of the present invention;

FIG. 6 illustrates a cross-sectional view along the PLANE 6—6 of FIG. 5; and,

FIG. 7 illustrates a cross-sectional view along the PLANE 7—7 of FIG. 5.

DETAILED DESCRIPTION OF THE PREFERRED EMBODIMENT

Figure 3:
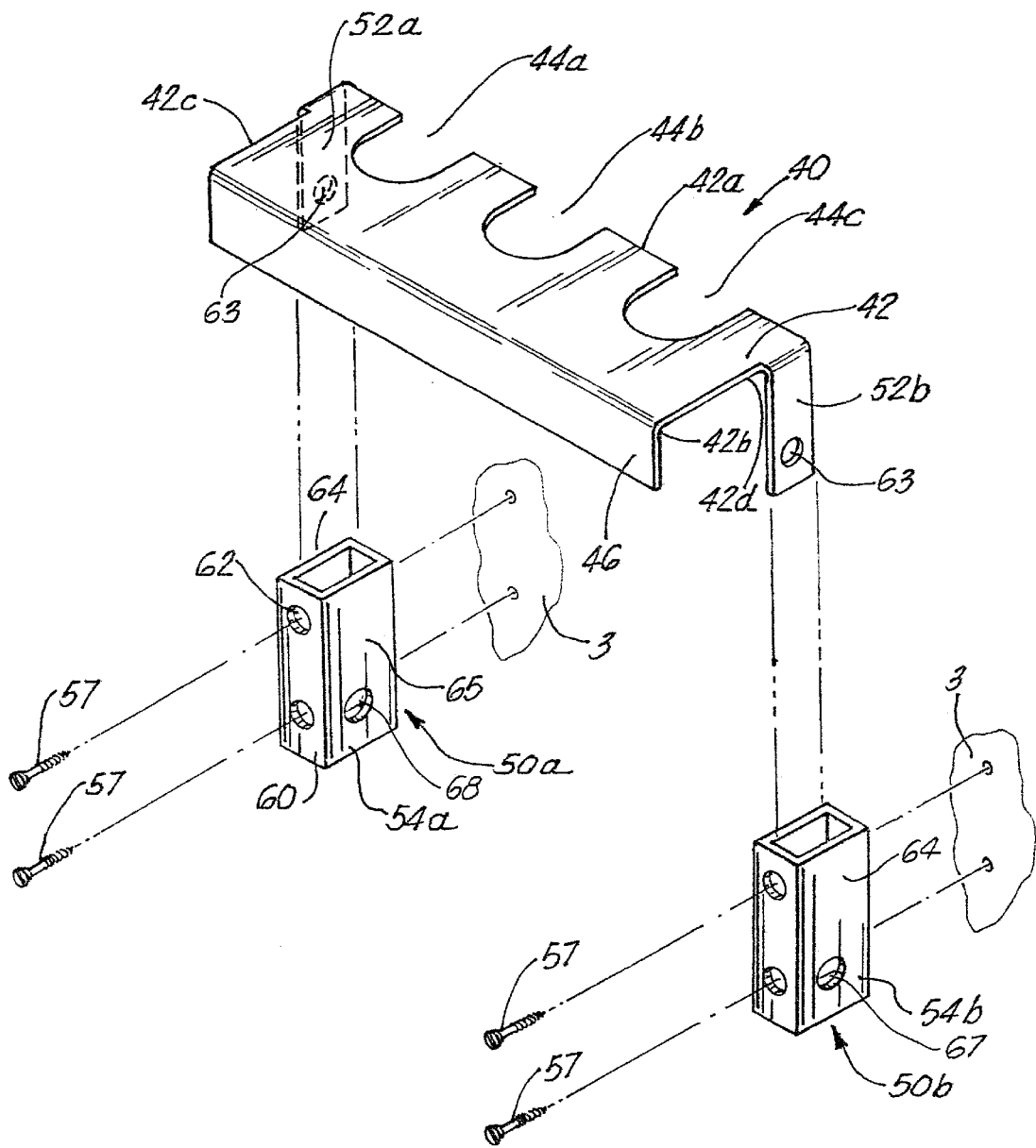
FIG. 3 illustrates an exploded view of the lockable reel cover of the present invention.

Referring now to the drawings and in particular FIGS. 1–4, the secure fishing pole and reel locking assembly of the present invention is generally referenced by the numeral 10. The secure fishing pole and reel locking assembly 10 is designed to securely store and lock both the fishing poles 5 and their reels 4. The secure fishing pole and reel locking assembly 10 is generally comprised of a pole holder rack 20 and a lockable reel cover 40 both of which are mountable to a wall 3 of a boat, other vessel or vehicle.

The pole holder rack 20 includes a plurality of spaced-apart horizontal mounting bars 22a, 22b having fixedly mounted thereto a plurality of spaced-apart vertical tubes 24a, 24b, 24c which are perpendicular to the horizontal mounting bars 22a, 22b. The vertical tubes 24a, 24b, 24c are hollow cylindrical chambers substantially closed at the bottom distal end. The hollow cylindrical chamber may include a small aperture in the bottom to permit fluids to escape. The top distal end of each hollow cylindrical chambers is open to receive a fishing pole 5 therein.

In the preferred embodiment of FIG. 1, two (2) mounting bars 22a, 22b and three (3) vertical tubes 24a, 24b, 24c are provided, but the numbers can vary. Furthermore, in the preferred embodiment, the top distal end of each vertical tubes 24a, 24b, 24c flares and includes a front downwardly tapered slot 26 and a back downwardly tapering slot 27 which is essentially diametrically opposed to the front slot for receiving and holding the fishing reel's mount 1 (FIG. 2) attached to the fishing pole 5. Thereby, the fishing reel 4 is positioned in the front of it respective one of the vertical tubes 24a, 24b, 24c, as best seen in FIGS. 1 and 2.

The horizontal mounting bars 22a, 22b are secured to a vertical wall 3 of the boat in a conventional manner (e.g., bolting, riveting or welding). Likewise, the vertical tubes 24a, 24b, 24c, are secured to the horizontal mounting bars 22a, 22b in a conventional manner (e.g., bolting, riveting or welding).

Referring also to FIG. 3, the lockable reel cover 40 includes an elongated top horizontal plate 42 having a plurality of spaced-apart notch or grooves 44a, 44b, 44c formed along a rear edge 42a and which extend toward the front edge 42b. The spacing between the notch or grooves 44a, 44b, 44c is aligned with the spacing between the vertical tubes 24a, 24b, 24c. The notches or grooves 44a, 44b, 44c are generally arch-shaped but other shapes may be used. However, the width of each notch or groove should be smaller than the diameter of the vertical tubes 24a, 24b, 24c but slightly larger than the diameter of the fishing pole 5.

Fishing poles 5 are available in a variety of diameters. Moreover, the diameter of the fishing pole 5 above the reel 4 decreases in size than the diameter below the fishing reel 4. Hence, the notches or grooves 44a, 44b, 44c should be of a sufficient size to accommodate for the decreased diameter.

The depth of the notches or grooves 44a, 44b, 44c should be sufficient to permit the fishing pole 5 to remain essentially vertical while the fishing pole handle (NOT SHOWN) is in a respective one of the vertical tubes 24a, 24b, 24c. In other words, the depth of the notches or grooves 44a, 44b, 44c should extend substantially or in close proximity to the front downwardly tapered slot 26 formed in each of the vertical tubes 24a, 24b, 24c.

The lockable reel cover 40 further includes an elongated front vertical cover plate 46 perpendicular to the front edge 42b of the elongated top horizontal plate 42. The combination of the elongated top horizontal plate 42 and the front vertical cover plate 46 form a generally "L"-shaped cover member. The lockable reel cover 40 is adapted to be mounted to a vertical wall 3 of the boat in a conventional manner (e.g., bolting, riveting or welding) via a pair of lockable bracket devices 50a and 50b.

The pair of lockable bracket devices 50a and 50b include female bracket members 52a and 52b, respectively, extending along the side edges 42c and 42d of the elongated top horizontal plate 42 each of which has a hole 53 formed therein.

Referring now to FIGS. 3 and 5–7, the lockable bracket devices 50a and 50b further include male bracket members 54a and 54b, respectively, which are adapted to be mounted to the vertical wall 3 of a boat. In the exemplary embodiment, male bracket members 54a and 54b are attached via screws or bolts 57. The male bracket members 54a and 54b are generally boxed shaped which has a back wall 58 adapted to be mounted or bolted to the vertical wall 3 via the screws or bolts 57, as best seen in FIG. 3 through holes 59. Furthermore, the front wall 60 has formed therein holes 62 which are aligned with holes 59. Both the holes 62 and 59 are adapted to receive the screws or bolts 57.

The male bracket members 54a and 54b further include sidewalls 64 and 65 each of which has a hole 67, 68, respectively, formed therein. The hole 63 in each of the female bracket members 52a and 52b is aligned with holes 67, 68. Holes 63 and holes 67, 68 are adapted to receive pad locks 70a, 70b.

While the exemplary embodiment provides for two pad locks at each end of the lockable reel cover 40, one of the lockable bracket devices 50a and 50b can be substituted for a pivot hinge assembly which would allow the lockable reel cover 40 to swing upward or alternately outward, when unlocked, to access the fishing poles 5 and reels 4 stored in the pole holder rack 20.

In operation, the user unlocks and removes pad locks 70a, 70b, then lifts the lockable reel cover 40 so that the female brackets 52a, 52b are removed from the male brackets 54a, 54b. Thereafter, the lockable reel cover 40 can be moved away and rested upon an available support surface. Once, the lockable reel cover 40 is removed, fishing poles 5 can be removed from or placed in a vertical tube 24 of the pole holder rack 20.

After inserting or removing a pole 5, the lockable reel cover 40 is again placed in its locked position to cover the reels 4 of the fishing poles 5. In doing so, the female brackets 52a, 52b are inserted in their respective male brackets 54a, 54b. While connecting the female brackets 52a, 52b to the male bracket 54a, 54b, the portion of the fishing pole 5 above the reel 4 is inserted into one of the notches or grooves 44a, 44b, 44c. Thereafter, the female brackets 52a, 52b are inserted in their respective male brackets 54a, 54b and locked with pad locks 70a, 70b.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A secure fishing pole and reel locking assembly comprising:
   a pole holder rack mountable to a wall and which is adapted to store and support at least one fishing pole wherein the at least one fishing pole includes at least one reel; and,
   a lockable reel cover mountable to the wall and which, when locked, locks the at least one fishing pole in the pole holder rack and covers the at least one reel.

2. The assembly of claim 1, wherein the pole holder rack includes:

at least one horizontal mounting bars mountable to the wall; and, a plurality of spaced-apart vertical tubes which are perpendicular to the at least one horizontal mounting bar, each vertical tube has a generally closed bottom end and an open top end.

3. The assembly of claim 2, wherein the lockable reel cover includes:

an top horizontal plate having a plurality of spaced-apart notches or grooves formed along a rear edge and extends toward a front edge, each notch or groove is aligned with and smaller than a diameter of a respective vertical tube but slightly larger than a diameter of the at least one fishing pole; and, a front cover plate perpendicularly coupled to the front edge of the top horizontal plate and which covers the at least one reel.

4. The assembly of claim 2, wherein the top distal end of each vertical tube includes:

a front downward slot; and, a back downward slot, which is essentially diametrically opposed to the front slot for receiving and holding a fishing reel's mount attached to the at least one fishing pole.

5. The assembly of claim 1, further comprising:

a lockable bracket device mountable to the wall and which is adapted to be coupled to the lockable reel cover; and, a lock for locking the lockable bracket device and the lockable reel cover to lock the lockable reel cover over the at least one reel.

6. The assembly of claim 1, wherein the lockable reel cover includes an "L"-shaped cover which is adapted to be mounted to said wall and locked and has at least one notch adapted to receive the at least one fishing pole at a position above the at least one reel.

7. A secure fishing pole and reel locking assembly comprising:

means, mountable to a wall, for holding a plurality of fishing poles, wherein each fishing pole includes a reel; and, means, mountable to the wall, for locking the plurality of fishing poles in the holding means and covering said reel of said each fishing pole.

8. The assembly of claim 7, wherein the locking means includes an "L"-shaped cover which is adapted to be mounted to said wall and locked having at least one notch, which is adapted to receive a respective fishing pole at a position above the reel.

9. The assembly of claim 7, wherein said holding means includes:

a plurality of spaced-apart hollow chambers, each hollow chamber receives and supports therein a respective fishing pole;

means for mounting said plurality of spaced-apart hollow chambers to said wall.

10. The assembly of claim 9, wherein the locking means includes:

an top horizontal plate having a plurality of spaced-apart notches or grooves formed along a rear edge and extends toward a front edge, each notch or groove is aligned with and smaller than a diameter of a respective hollow chamber but slightly larger than a diameter of said each fishing pole; and, a front cover plate downwardly depending from the front edge of the top horizontal plate and which covers the reel.

11. The assembly of claim 9, wherein the top distal end of each hollow chamber includes:

a front downward slot; and, a back downward slot, which is essentially diametrically opposed to the front slot for receiving and holding a fishing reel's mount attached to the respective fishing pole.

12. The assembly of claim 8, further comprising:

means for mounting the "L"-shaped cover to said wall; and, means for locking the "L"-shaped cover.

13. A method of securing and locking at least one fishing pole and at least one reel comprising the steps of:

holding the at least one fishing pole and the at least one reel one a wall in a pole holder rack;

closing a lockable reel cover over the pole holder rack to cover that at last one reel; and, locking the lockable reel cover which locks the at least one fishing pole and the at least one reel in the pole hold rack.

* * * * *